(12) United States Patent
Cox

(10) Patent No.: US 7,805,425 B2
(45) Date of Patent: Sep. 28, 2010

(54) EFFICIENT DATABASE LOOKUP OPERATIONS

(75) Inventor: Shaun David Cox, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 11/413,231

(22) Filed: Apr. 28, 2006

(65) Prior Publication Data

US 2007/0255683 A1    Nov. 1, 2007

(51) Int. Cl.
G06F 7/00 (2006.01)
G06F 17/30 (2006.01)

(52) U.S. Cl. .................................. 707/706; 707/713
(58) Field of Classification Search .................. None
See application file for complete search history.

(56) References Cited

U.S. PATENT DOCUMENTS

| | | | |
|---|---|---|---|
| 6,301,609 B1 * | 10/2001 | Aravamudan et al. ....... | 709/207 |
| 6,950,823 B2 * | 9/2005 | Amiri et al. .................... | 707/10 |
| 7,158,969 B2 * | 1/2007 | Dettinger et al. ................ | 1/1 |
| 2006/0047782 A1 * | 3/2006 | Niemi ......................... | 709/220 |
| 2006/0080130 A1 * | 4/2006 | Choksi .......................... | 705/1 |
| 2007/0168336 A1 * | 7/2007 | Ransil et al. ................... | 707/3 |

* cited by examiner

*Primary Examiner*—Pierre M Vital
*Assistant Examiner*—Loan T Nguyen
(74) *Attorney, Agent, or Firm*—L. Alan Collins; Collins & Collins Incorporated

(57) ABSTRACT

A system, apparatus, method, and computer-readable media are provided for efficient database lookup operations. According to method, procedural checks for generating a response to a database query are converted into a set of database operations. The database operations are performed the first time a query of the database is received to generate a set of possible results for the query. The set of possible results for the query are then stored. A specific answer to the query is generated from the set of possible results. Future database queries are responded to by generating an answer to the query from the stored set of possible results.

17 Claims, 9 Drawing Sheets

EFFICIENT DATABASE LOOKUP OPERATIONS

BACKGROUND

More and more frequently, computer programs provide the ability to receive and display presence information regarding another computer user. Presence information generally refers to data describing the availability of a user and their willingness to communicate. For instance, instant messaging ("IM") client applications typically provide the ability to view the on-line/off-line status of individuals identified in a "buddy list," and their willingness to communicate, such as "available," "busy," or "away." Personal information manager ("PIM") programs may similarly show the on-line/off-line status for e-mail senders or other users identified in a contacts list or address book. Additionally, other types of presence information may also be provided. For example, presence information may include phone numbers, meeting information, notes, or other messages related to the availability of the user.

The publisher of presence information can typically assign permissions to different presence publications. The assignment of permissions may be based on factors like the specific identity of the user requesting the publication (the "requester"), whether or not the requester is a "buddy" of the publisher of the presence information, what domain the requestor belongs to, and others. A user can also specify that one version of the presence publication be provided if the requester matches a specific identity, and that another version of the same publication be provided if the requestor is a member of a specific domain. The presence publications and their associated permissions are typically stored in a database by a presence server. The presence server may be integrated into an IM server computer or a server computer configured to operate with a PIM.

When a request is received for a particular presence publication at a presence server, it is necessary to perform multiple database lookups in a procedural fashion to respond to the request. This is generally required because a requestor may match several permissions. In this case, a procedure must be followed to determine which version of the publication should be provided to the user. As an example, permission to a presence publication may be granted to a list of users and permission to another version of the same publication may be granted to users in a specified domain. If the requestor is identified in the list and is also a member of the specified domain, it becomes necessary to evaluate multiple procedural rules over the database in order to determine which version of the presence information should be provided. These operations can become computationally expensive, especially in the context of a presence server that must evaluate many hundreds of requests for presence information each second.

It is with respect to these considerations and others that aspects of a computing system for performing efficient database lookups are described below.

SUMMARY

A system, apparatus, method, and computer-readable media are provided for efficient database lookup operations. According to one aspect of a method provided herein, procedural checks for generating a response to a database query are converted into a set of database operations. The database operations are performed the first time a query of the database is received to generate a set of possible results for the query. The set of possible results for the query are then stored. A specific answer to the query is then generated from the set of possible results. Additionally, future database queries are responded to by generating an answer to the query from the stored set of possible results. In this manner, the procedural checks do not need to be performed each time a database query is received.

The database query may be received in the form of a request for a presence publication. In this case, the set of possible results for the query is a table that includes one or more rows. Each row of the table includes a publisher data field for storing data identifying a publisher of the requested presence publication and a data field for storing data identifying the requestor of the presence publication. Each row of the table also includes a container data field for storing data identifying a container from which the request may be satisfied and a rank data field for storing a rank value. A container is a data structure that includes a membership data field for storing data identifying one or more requesters authorized to receive presence publications identified in a publication field of the container.

The set of possible results may be generated by creating a new row in the table for each container maintained by the publisher of the requested publication that identifies the requestor in its membership data field. For each new row, data is stored in the publisher data field identifying the publisher, data is stored in the requestor data field identifying the requestor, data is stored in the container field identifying the container, and a value is stored in the rank data field that is based on the manner in which the membership data field identifies the requestor. For instance, a higher value may be stored for a more specific identification than a less specific identification.

In order to compute a specific answer to the query, a database "select" operation is performed on the table to identify a set of candidate rows. A database "join" operation is then performed between the set of candidate rows and the publication data fields of the containers identified in the candidate rows to identify the specific answer. The specific answer is then provided in response to the database query.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
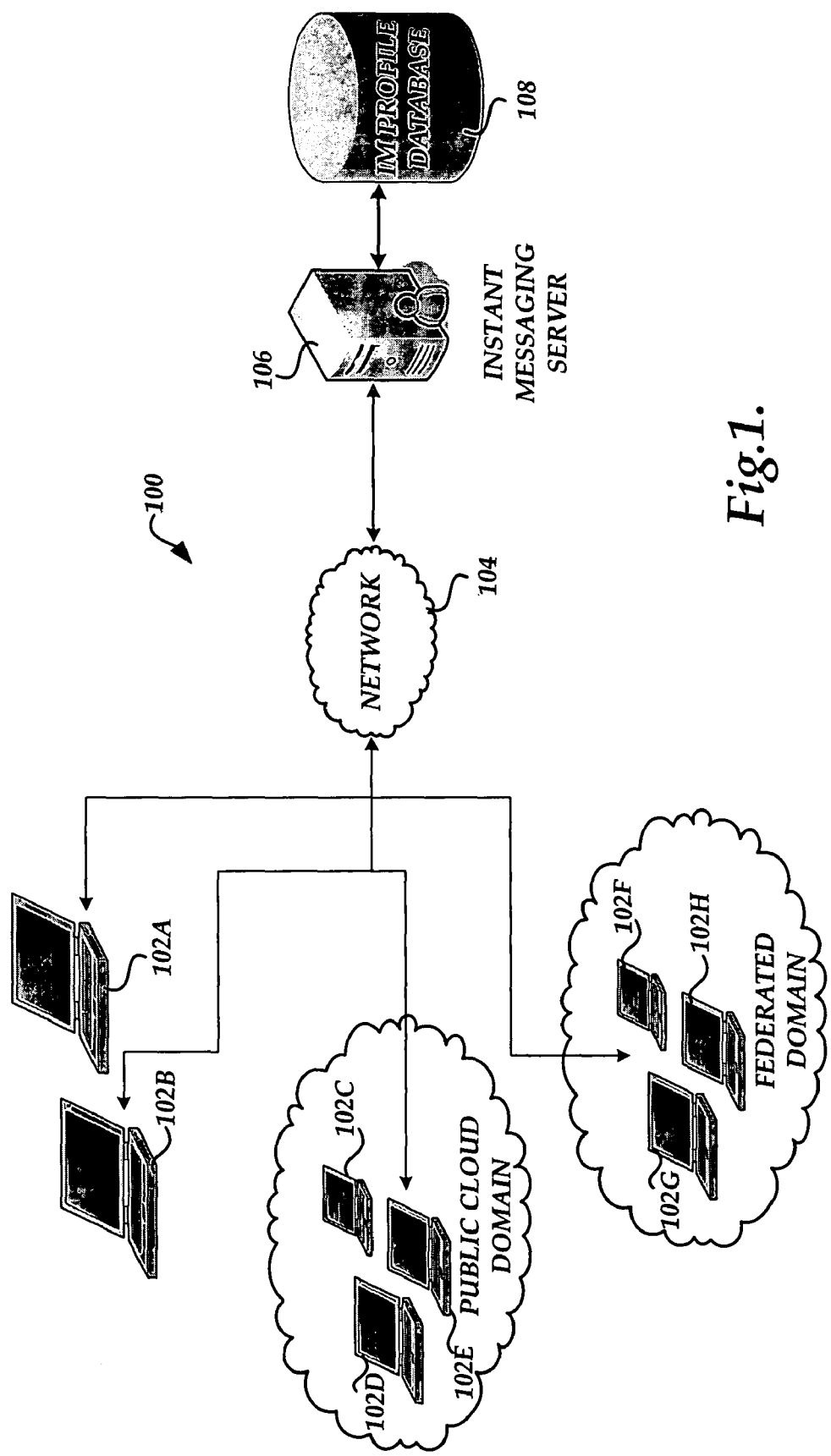
FIG. 1 is a network diagram illustrating aspects of an illustrative operating environment.

The following detailed description is directed to systems, methods, and computer-readable media for efficient database lookup operations. While the subject matter described herein is presented in the general context of program modules that execute in conjunction with the execution of an operating system on a computer system, those skilled in the art will recognize that other implementations may be performed in combination with other program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

In the following detailed description, references are made to the accompanying drawings that form a part hereof, and which are shown by way of illustration specific embodiments or examples. Referring now to the drawings, in which like numerals represent like elements through the several figures, aspects of a computer system for performing efficient database lookup operations will be described. In particular, FIG. 1 shows aspects of an illustrative operative environment for the subject matter described herein.

The illustrative operating environment 100 shown in FIG. 1 includes a computer 102A. The computer 102A comprises a general purpose desktop or laptop computer operable to connect to a network 104, such as the Internet. The computer 102A is also operable to execute an operating system and a client application through which a user of the computer 102A may publish presence information. Presence information generally refers to data describing the availability of the user of the computer 102A and her willingness to communicate. For instance, an IM client application may be executed on the computer 102A that communicates with the IM server 106. In addition to other features, the IM client application provides the ability for the user of the computer 102A to publish presence information to the IM server 106. A user of the computer 102A is referred to herein as the "publisher" of presence information.

The IM server 106 is a server computer operative to enable instant messaging communications between IM client applications executing on two or more of the computers 102A-102H. The IM server 106 may also enable other types of interaction between the IM client applications, such as voice or video chat. To enable these features, the IM server 106 maintains an IM database 108. The IM database 108 is utilized to store user profiles for each registered user of the IM server 106. A user profile may include data such as the user's identity, electronic mail address, contact preferences, interests, and other information. According to embodiments, each user profile also include presence publications and permissions to the presence publications. A presence publication is a specific instance of presence information.

The computers 102B-102H may also comprise general purpose desktop or laptop computers operative to execute an IM client application. Through the IM client application, a request may be made to the IM server 106 for the presence information published by the user of the computer 102A. The users of the computers 102B-102H are, therefore, referred to herein as "requesters." The IM client application executing on the computers 102B-102H is operative to receive from the IM server 106 the presence information and to display the information. For instance, the on-line/off-line status of the user of the computer 102A may be displayed along with their willingness to communicate, such as "available," "busy," or "away." Additionally, other types of presence information may also be provided. For example, presence information may include phone numbers, meeting information, notes, or other messages related to the availability of the user. It should be appreciated that many other types of applications programs are also operative to request presence information from a server computer, such as a PIM application.

The IM client application executing on the computer 102A also allows a user to assign permissions to different presence publications. The assignment of permissions may be based on factors like the specific identity of the requester, whether or not the requestor is a "buddy" of the publisher of the presence information, what domain the requestor belongs to, and others. The publisher can also specify that one version of the presence publication be provided if the requestor matches a specific identity, and that another version of the same publication be provided if the requester is a member of a specific domain. As mentioned above, the presence publications and their associated permissions are typically stored in a database 108 by the IM server 106 or other type of presence server.

As shown in FIG. 1, the computers 102D-102E are members of a public cloud domain. A public cloud domain is a domain associated with a public messaging system. For instance, the domain "msn.com" may be considered a public cloud domain because users of the MICROSOFT MESSENGER IM client application frequently utilize this domain. As also shown in FIG. 1, the computers 102F-102H are members of a federated domain. A federated domain is a domain that is associated with the domain that the user of the computer 102A belongs to. For instance, two companies may have a close business relationship, such that their domains are considered federated. As will be described in greater detail below, the assignment of permissions to presence information may also be made based upon whether the requestor is a member of a public domain or a federated domain.

As will be described in greater detail below, the IM server 106 is operative to receive and respond to requests from requesters for presence publications of publishers. These requests typically arrive in the form of queries of the database 108. In order to determine which presence publication should be provided to a particular requester, the IM server 106 is operative to perform a series of operations, which are more fully described below with reference to FIGS. 3-7.

Figure 2:
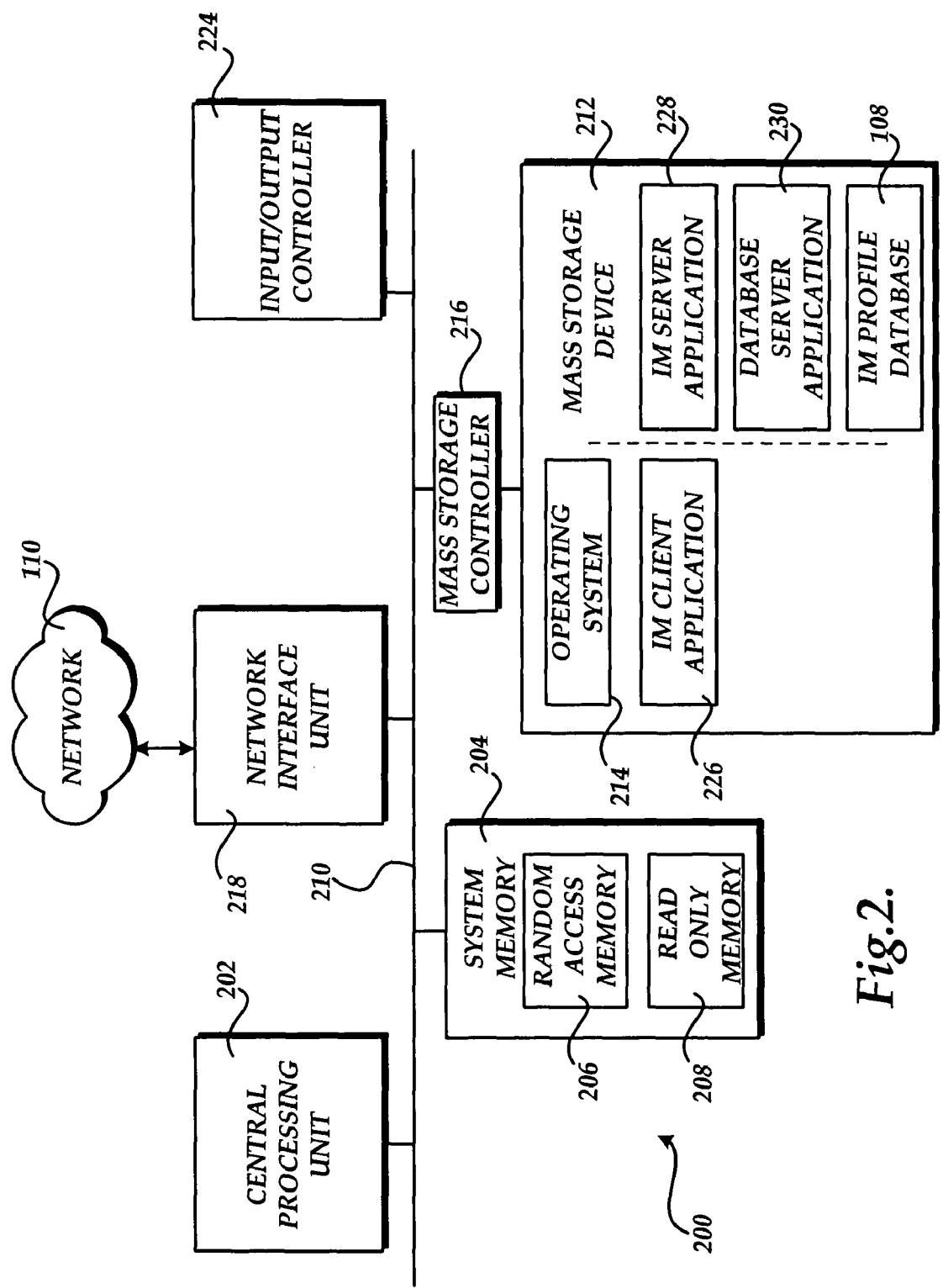
FIG. 2 is a computer architecture diagram suitable for implementing a computer system such as discussed with reference to FIGS. 1 and 3-7.

Referring now to FIG. 2, additional details regarding the structure and operation of the computers 102A-102H and 106 will be provided. In particular, FIG. 2 shows an illustrative computer architecture for a computer 200. This computer architecture may be utilized to embody the computer systems illustrated in and discussed above with reference to FIG. 1. For instance, the computer architecture shown in FIG. 2 may be utilized to implement the computers 102A-102H, the IM server 106, and any other computer systems discussed herein. It should be appreciated that although the computer architecture shown in FIG. 2 embodies a standard laptop, desktop, or server computer, other types of computer architectures and computing devices may be utilized. In particular, the subject matter described herein may be utilized with a conventional desktop or "personal" computer, a laptop computer, a hand-held or portable computing device, a server computer, a wireless handset, such as a cellular or PCS telephone, a personal digital assistant, a custom hardware device, and virtually any other type of computing device.

The computer architecture shown in FIG. 2 includes a central processing unit 202 ("CPU"), a system memory 204, including a random access memory 206 ("RAM") and a read-only memory ("ROM") 208, and a system bus 210 that couples the memory to the CPU 202. A basic input/output system containing the basic routines that help to transfer information between elements within the computer, such as during startup, is stored in the ROM 208. The computer 200 further includes a mass storage device 212 for storing an operating system 214, application programs, and other program modules, which will be described in greater detail below.

The mass storage device 212 is connected to the CPU 202 through a mass storage controller 216 connected to the bus 210. The mass storage device 212 and its associated computer-readable media provide non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computer 200.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 200.

According to various embodiments of the subject matter described herein, the computer 200 may operate in a networked environment using logical connections to remote computers through a network 110, such as the Internet. The computer 200 may connect to the network 110 through a network interface unit 218 connected to the bus 210. It should be appreciated that the network interface unit 218 may also be utilized to connect to other types of networks and remote computer systems. The computer 200 may also include an input/output controller 224 for receiving and processing input from a number of other devices, including a keyboard, mouse, or electronic stylus (not shown in FIG. 2). Similarly, an input/output controller 224 may provide output to a display screen, a printer, or other type of output device (also not shown in FIG. 2).

As mentioned briefly above, a number of program modules and data files may be stored in the mass storage device 212 and RAM 206 of the computer 200, including an operating system 214 suitable for controlling the operation of a networked personal or server computer, such as the WINDOWS XP operating system from MICROSOFT CORPORATION of Redmond, Wash. Other operating systems may also be utilized, such as the LINUX operating system, the OSX operating system from APPLE COMPUTER, and others.

The mass storage device 212 and RAM 206 may also store one or more program modules. In particular, the mass storage device 212 and the RAM 206 may store an IM client application 226. As described briefly above, the IM client application 226 comprises an application program operative to communicate with the IM server computer 106 and, potentially, directly with other IM client applications. The IM client application 226 provides functionality and a user interface that allows registered users of the IM server computer 106 to communicate with one another through text, audio, or video messaging.

According to an implementation, the IM client application 226 is also operative to allow a user to define and publish presence information to other users of the IM server computer 106. The IM client application 226 may also allow a user to define permissions for the presence publications as described herein. The IM client application 226 may comprise the MSN MESSENGER instant messaging client application program from MICROSOFT CORPORATION or another IM client application from another manufacturer. It should be appreciated that although the functionality for defining presence publications and permissions is described herein as being performed by the IM client application 226, other types of applications may provide similar functionality. For instance, a PIM application program may be utilized to define presence publications and permissions for use by other users of the PIM application program. Other types of programs may also be utilized in a similar manner.

As shown in FIG. 2, the mass storage device 212 may also store an IM server application 228, a database server application 230, and an IM profile database 108. The IM server application 228 is executed by the IM server 106 and provides functionality for enabling instant messaging communications between IM client applications. As discussed herein, the IM server application 228 is also operative to receive and respond to requests for presence information. In order to evaluate such requests and respond in an appropriate fashion, the IM server application 228 utilizes the services of a database server application 230. The database server application 230 comprises a server application for creating, maintaining, and querying a database such as the IM profile database 108. According to an embodiment, the database server application 230 comprises SQL SERVER from MICROSOFT CORPORATION. However, it should be appreciated that other types of database server applications from other vendors may be utilized. It should also be appreciated that the functions described herein as being performed by the IM server 106 for receiving and responding to requests for presence information may be performed by a server specially configured for receiving and responding to requests for such presence information (a "presence server") or another type of server computer.

Figure 3:
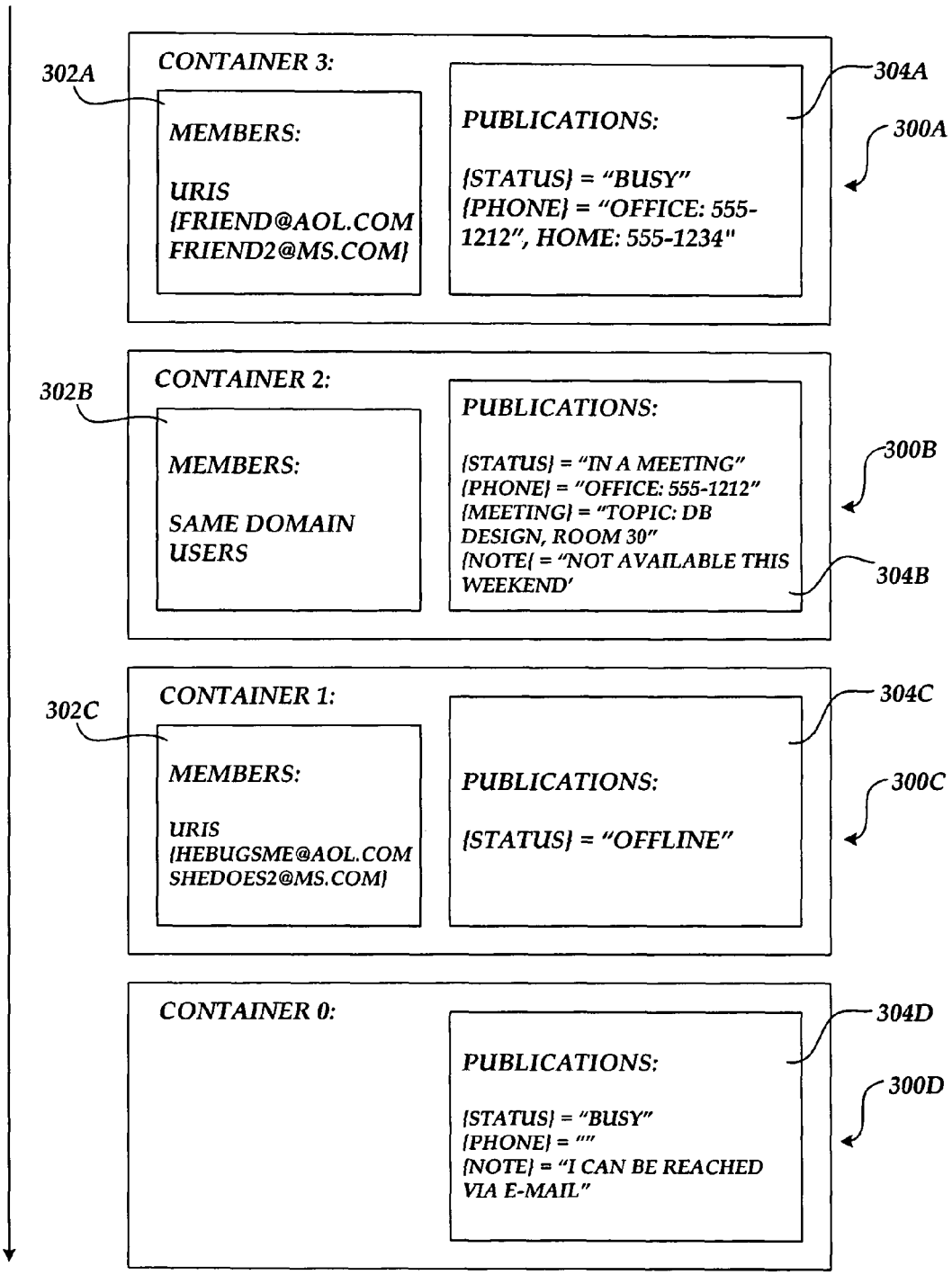
FIG. 3 is a data structure diagram illustrating aspects of a container data structure.

Referring now to FIG. 3, an illustrative data structure for storing presence publications and their associated permissions will be described. In particular, FIG. 3 shows several container data structures 300A-300D maintained by the IM server 106 and stored in the IM profile database 108. Each container 300A-300D includes a membership data field 302 for storing data identifying one or more requesters that are authorized to receive the presence publications stored in the container. The authorized requesters may be specified in the membership data field 302 by a list of specific subscriber uniform resource identifiers ("URIs"), such as in the containers 300A and 300C, all contacts of the publisher, users in the same domain as the publisher, such as in the container 300B, a list of session initiation protocol ("SIP") domains, users in a federated domain, or users in a public cloud domain. It should be appreciated that the first and fourth items are lists, while "all contacts," same domain users, federated users, and public cloud users may be specified as Boolean attributes of the container which contribute to its membership. For example, if a container's membership is to include all subscribers in the same domain as the publisher, then an attribute of the container for same domain users is set to true. It should be appreciated that the contents of the containers 300A-300D are defined by a publisher with which the containers are associated. The containers are stored in the IM profile database 108 along with a profile for the publisher.

As shown in FIG. 3, each of the containers 300A-300D also includes a publication data field 304A-304D, respectively. The publication data field 304 is utilized to store the presence publications associated with the container. The presence publications stored with the container are the presence publications that the requestors identified in the membership data field 302 are authorized to receive. For instance, the container 300A includes the publications "{STATUS}='BUSY'" and "[PHONE}='OFFICE: 555-1212', 'HOME: 555-1234.'" The requesters specifically identified in the membership data field 302A are authorized to receive these publications.

As also shown in FIG. 3, the containers 300A-300D are numbered in sequential order. The container numbers are utilized to determine the container that should be utilized to satisfy a request for a presence publication when a requestor is a member of more than one container. In particular, when a requestor requests a publication that is published in multiple containers, a determination must be made as to which container should be utilized to satisfy the request. As a general matter, it is only necessary to consider those containers that include the requested presence publication. If there is only one container that has the subscriber as a member, then there is no ambiguity, and that container is utilized to respond to the request. When multiple containers have the subscriber in their membership, however, then the request is satisfied from the container having the highest container number. This is where ordering of containers based on their container numbers applies. Higher number containers take precedence over lower numbered ones when they contain overlapping membership. It should be appreciated that the container 300D is a default container that includes default publications given to anyone that does not fall into a higher numbered container. Accordingly, the container 300D does not include a membership data field 302.

It should be appreciated that a requestor may be contained in the membership of more than one container in different ways. For example, one container may specify joe@aol.com in its URI list, while another container specifies public cloud users. In this case, joe@aol.com is considered a member of both containers. Similarly, one container may specify all contacts, which subsequently contains friend2@ms.com, while another container specifies same domain users. If the publisher is a member of the ms.com domain, then friend2@ms.com is a member of both containers. In these situations, the question of which container to use to satisfy a subscription is answered by giving priority based on the specificity of the allocated permissions. For instance, priority may be given first to the URI list, then to all contacts, then to same domain users, then to the domain list, then to federated domains, and finally to public cloud users.

In view of the above, it should be appreciated that a series of procedural checks must generally be performed in order to determine which container a request for a presence publication should be satisfied from. To summarize, the highest number container which contains both the requested presence publication and includes the requestor in the membership data field is selected. If a matching container is found, then the procedure can stop. If not, a determination is made as to whether the requestor is a member of a specific contact group. If so, the highest number container that contains both the requested publication and which contains a contact group membership matching the group is selected. If a matching container is found, then the procedure can stop. If the requestor is on the contact list of the publisher, the highest numbered container is selected that has the requested publication and has its all contacts Boolean property set. If a matching container is found, then the procedure can stop. Otherwise, a determination is made as to whether the requester is in the same domain as the publisher. If so, the highest numbered container is selected that includes the requested publication and has its same domain Boolean property set. If a matching container is found, then the procedure stops. Otherwise, the highest container is selected that contains the requested publication and contains a domain membership list containing the domain of the requestor. If no such container is found, and the requester is a member of a federated domain, then the highest numbered container that contains the requested publication and has its federated users Boolean property set is utilized. If no such container is found, and the requester is a member of a public cloud domain, then the highest numbered container that contains the requested publication and has its public cloud users Boolean property set is utilized. If no container is found, and the default container 300 D contains then requested property, then the default container is utilized. Otherwise, the request is blocked and the requester will receive an empty data value for the requested presence publication.

It should be appreciated that performing the above procedural checks each time a request is received at the IM server 106 for a presence publication is extremely computationally expensive. Accordingly, in order to more efficiently process these requests, the embodiments described herein first convert the procedural checks into database operations. These operations are performed to generate a set of possible results for a query and the set of possible results are stored for future use. When a subsequent query is received, the set of possible results are utilized to compute a specific answer to the query without again performing the procedural checks. Details regarding this process are provided below with respect to FIGS. 4-7.

Figure 4:
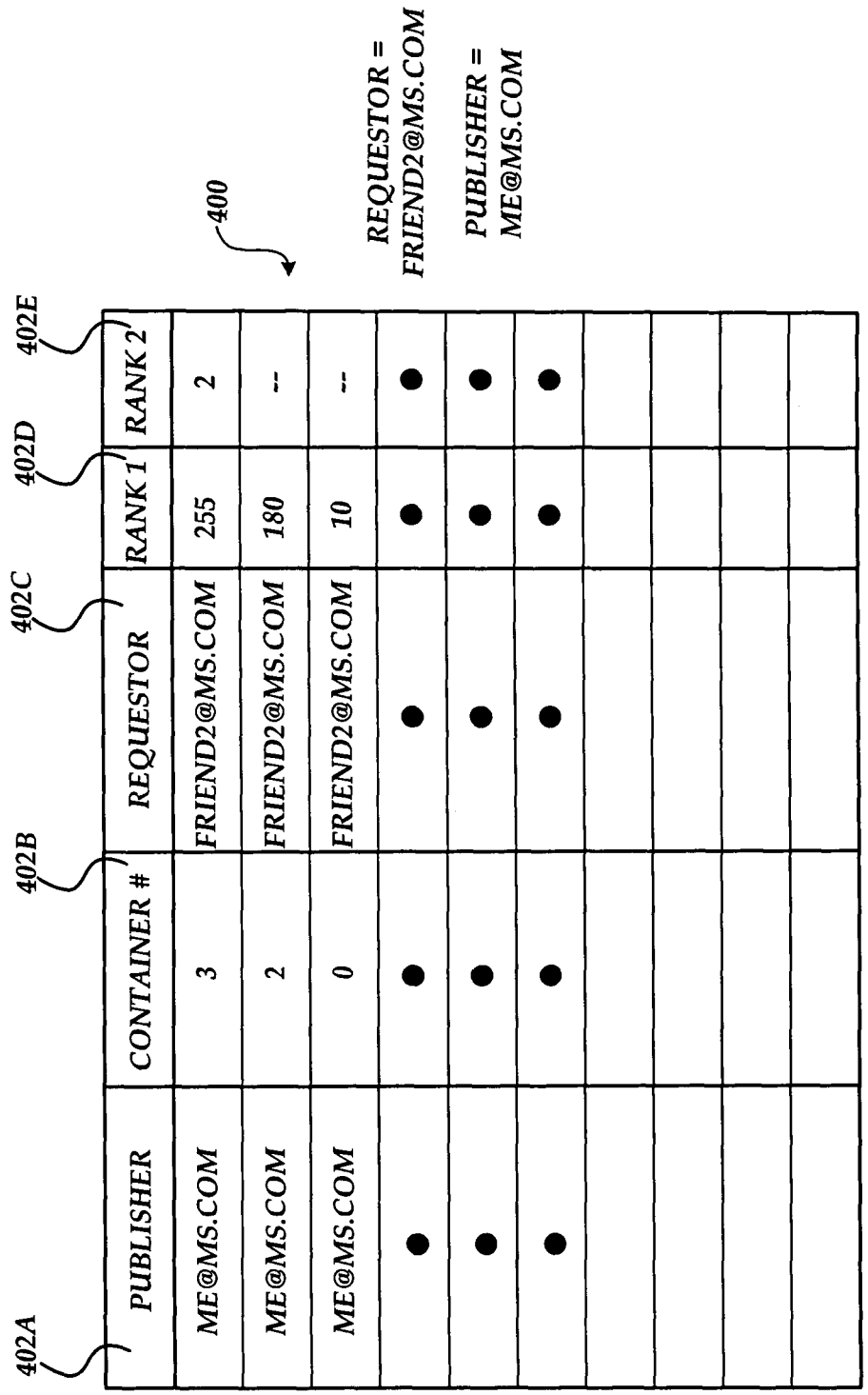
FIG. 4 is a data structure diagram illustrating aspects of a cached container member table.

Turning now to FIG. 4, an illustrative data structure for storing an set of possible results for a query will be described. In particular, FIG. 4 shows a cached container member table 400 created and utilized by the IM server 106 for responding to database queries for presence publications in an efficient manner. The table 400 includes a publisher data field 402A for storing data identifying a publisher of the requested presence publication, a requestor data field 402C for storing data identifying a requester of the presence publication, a container data field 402B for storing data identifying a container 300 from which the request may be satisfied, and a rank data field 402D for storing a rank value. The rank value is determined based on the manner in which the membership data field identifies the requester. For instance, a more specific identification would have a higher rank than a less specific identification. According to an embodiment, a specifically identified requestor is given the rank of 255, same domain users are given the rank of 180, specified domain users are given the rank of 160, federated domain users are given the rank of 140, public cloud users are given the rank of 120, and the default container is given the rank of 10. Other rank values may be utilized. It should be appreciated that the illustrative contents of the table 400 are based on the containers 300A-300D where the requestor is friend2@ms.com and the publisher is me@ms.com.

According to an embodiment, the table 400 may include a data field 402E for storing a second rank value. The second rank value specifies the number of characters of domain match between the requestor's domain and the publisher's domain. This field may be utilized to further disambiguate containers in the case where the requester is a member of two containers by a specific domain. In this case, the container for which the domain match is longer will be utilized. An illustrative process for populating and utilizing the table 400 will be described below with reference to FIGS. 5-7.

Figure 5:
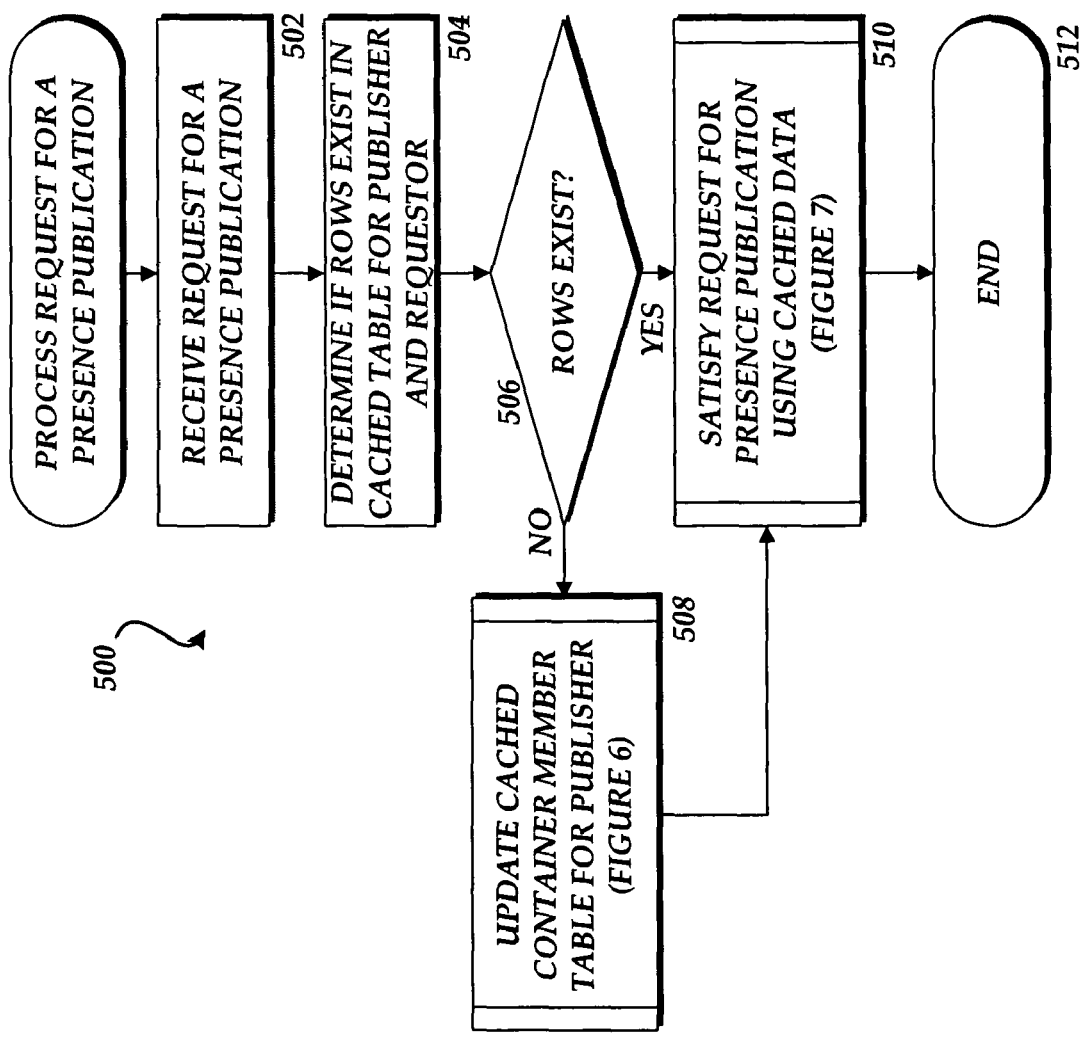
FIG. 5 is a flow diagram showing an illustrative routine for processing a request for a presence publication.

Turning now to FIG. 5, an illustrative routine 500 will be described showing the operation of the IM server 106 for processing a request for a presence publication. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein with respect to are referred to variously as operations, structural devices, acts, or modules. These operations, structural devices, acts and modules may be implemented in software, in firmware, in special purpose digital logic, and any combination.

The routine 500 begins at processing operation 502, where the server 106 receives a request for a presence publication. In response to the request, the server 106 determines whether rows exist in the table 400 for the requestor and the publisher of the requested presence publication. This is accomplished by examining the values stored in the fields 402A and 402C of the table 400. If rows do not exist in the table 400, the routine 500 branches to operation 508. At operation 508, the contents of the table 400 are generated and stored for the publisher. An illustrative routine for updating the contents of the table 400 is described below with respect to FIG. 6. From operation 508, the routine 500 continues to operation 510.

If, at operation 506, it is determined that rows do exist in the table 400 for the requester and the publisher, then the routine 500 continues from operation 506 to operation 510. At operation 510, the set of possible responses to the query stored in the table 400 are utilized to compute a specific response to the query in an efficient manner. An illustrative routine for computing the response and satisfying the request for the presence publication using the stored contents of the table 400 is described in detail below with respect to FIG. 7. Once this operation has completed, the routine 500 continues to operation 512, where it ends. Other database queries for presence publications are processed in a similar manner.

Figure 6A:
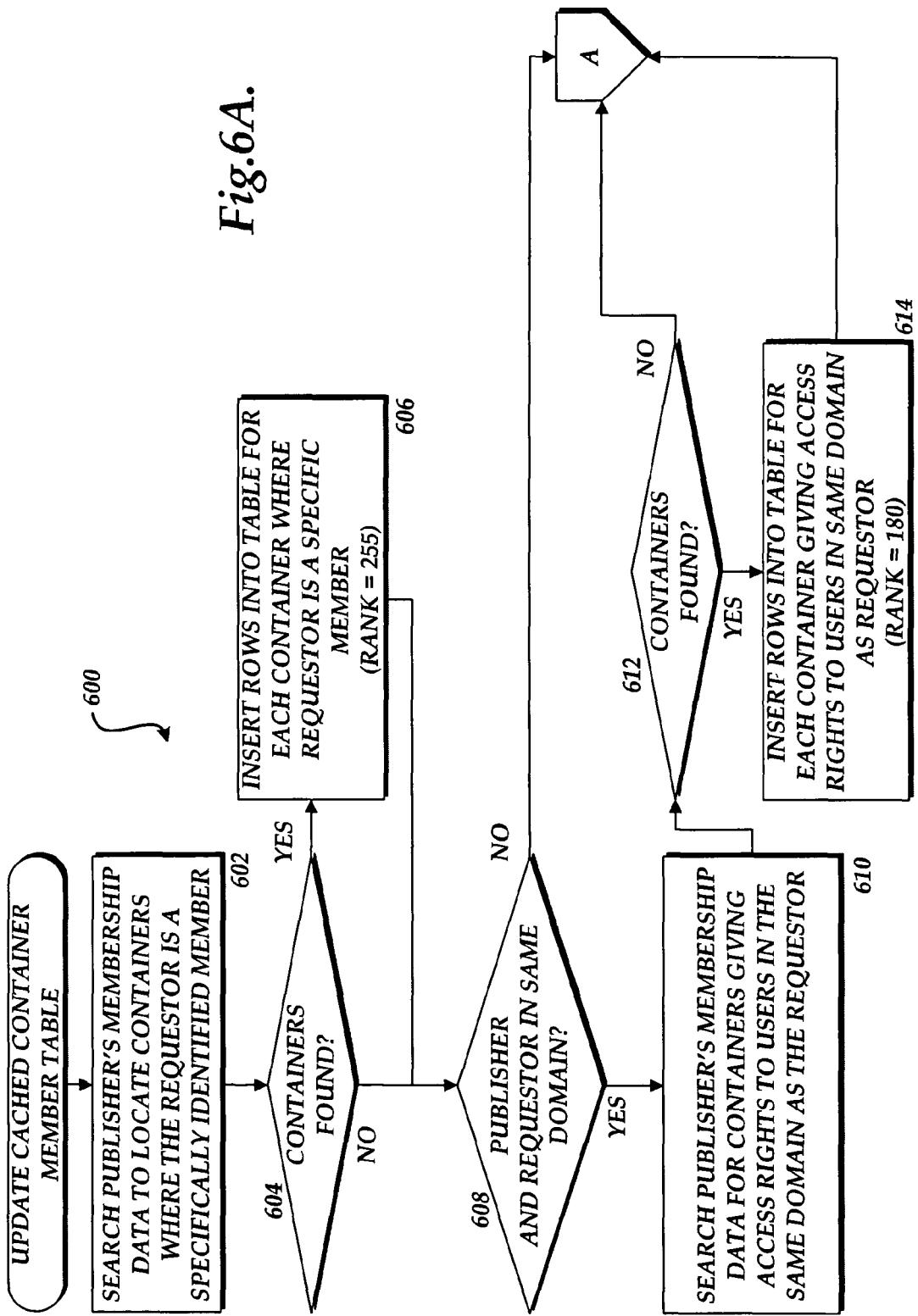
FIGS. 6A-6C are flow diagrams showing an illustrative routine for updating the contents of the cached container member table discussed with reference to FIG. 4.
Figure 6B:
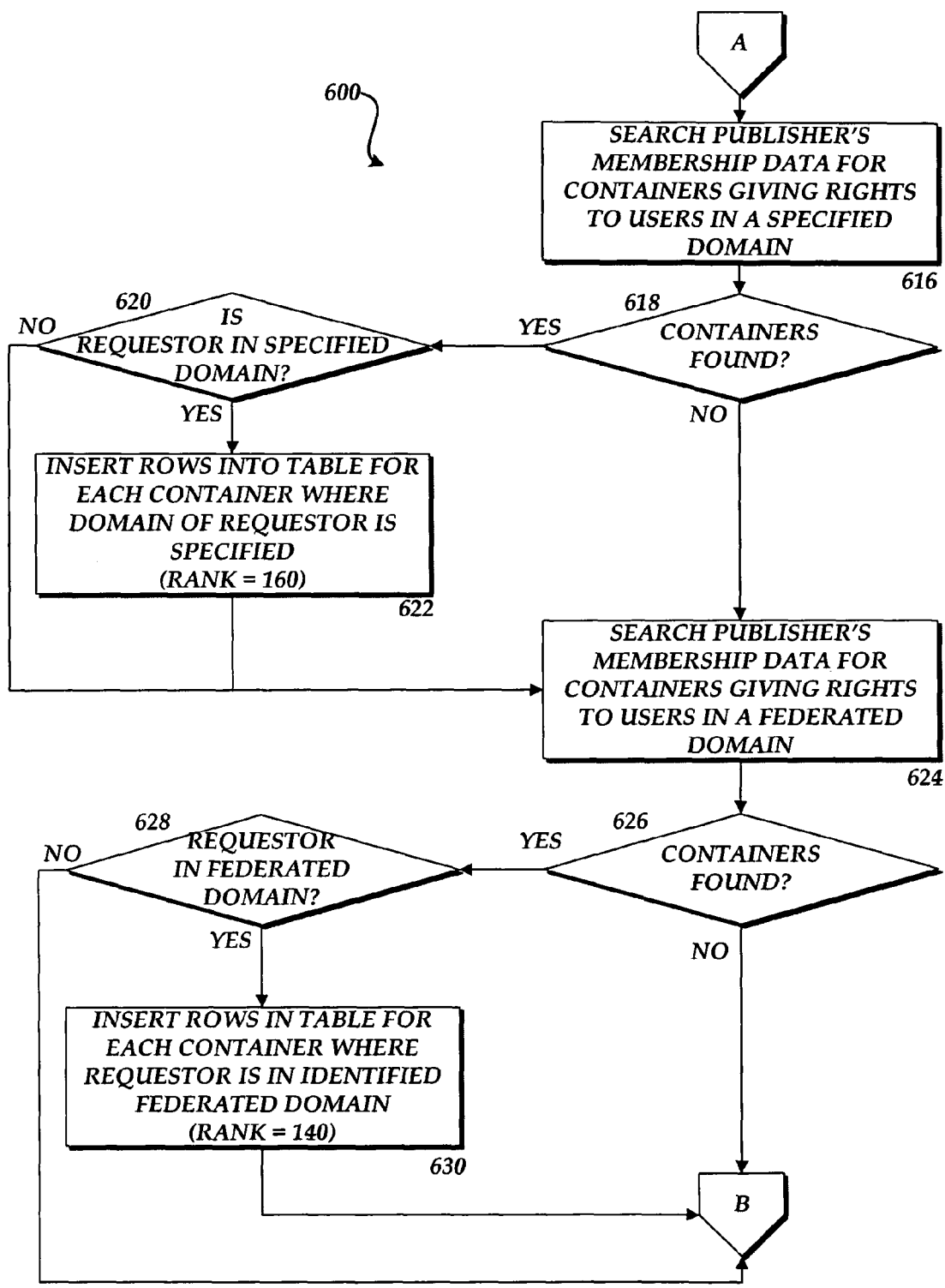
Figure 6C:
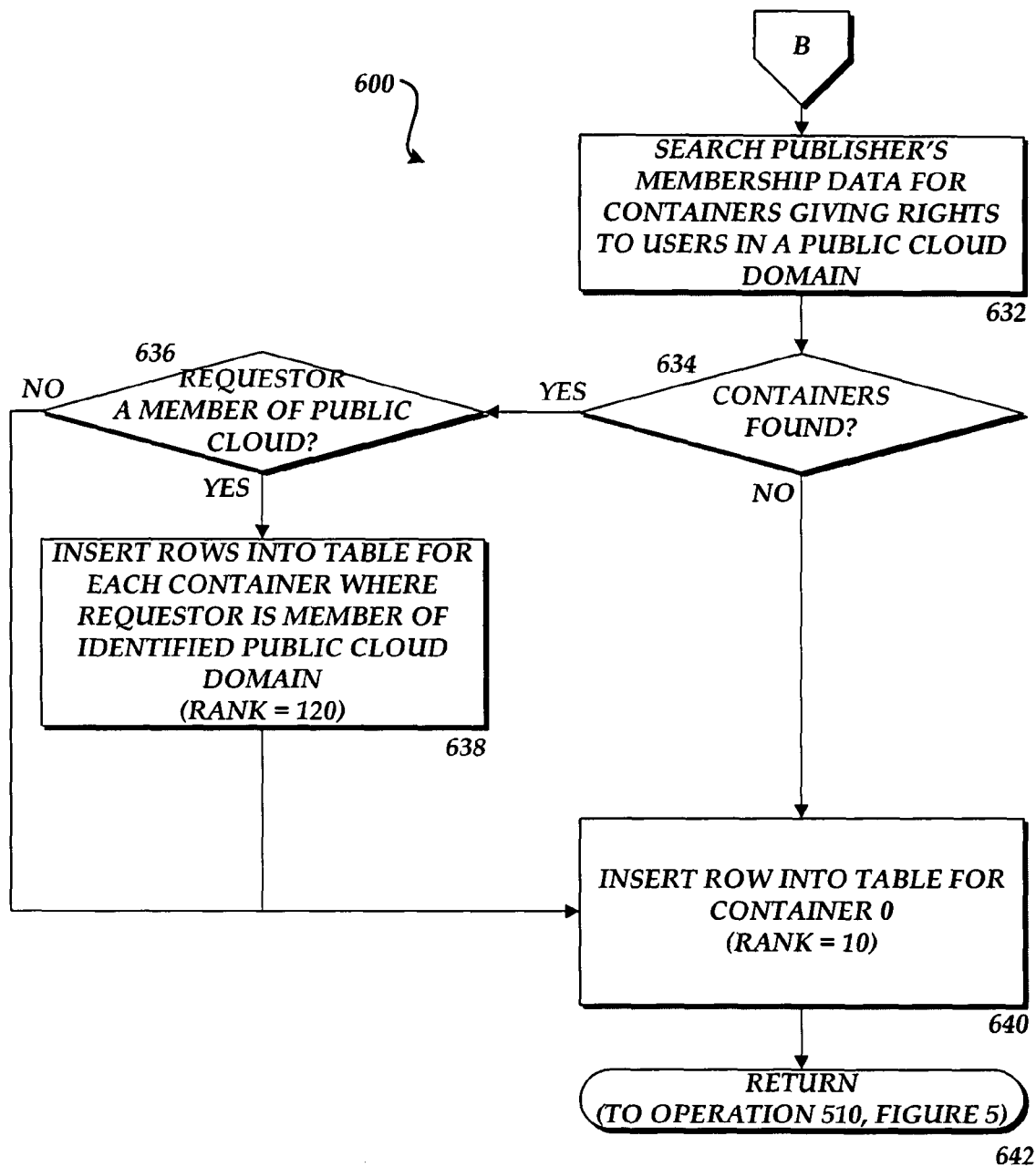

Turning now to FIGS. 6A-6C, an illustrative routine 600 for generating and updating the contents of the table 400 will be described. It should be appreciated that this routine may be performed in order to initially generate the contents of the table 400 for a publisher and to update the contents of the table 400 in the event that a publisher modifies their existing publication and permission data. It should also be appreciated that the database operations described with respect to FIGS. 6A-6C comprise the procedural checks described above. The results of these procedural checks are stored in the table 400 in a manner that permits subsequent database queries to be performed in an efficient manner.

The routine 600 begins at operation 602, where containers associated with the publisher are searched to locate containers where the requester is a specifically identified member. If any such containers are located, the routine 600 branches to operation 606, where a row is inserted into the table 400 for each container where the requester is a specifically identified member. For the new row, the value of the publisher field 402A is set to the identity of the publisher, the value of the requestor data field 402C is set to the requester, and the value of the container data field 402B is set to the container number of the identified container. The value of the rank field 402D in the new row is set to 255. Otherwise, the routine 600 continues from operation 604 to operation 608.

At operation 608, a determination is made as to whether the publisher and the requester are in the same domain. If so, the routine 600 continues from operation 608 to operation 610. At operation 610, a search is made to located containers giving permissions to users in the same domain as the requester. If such containers are found, the routine 600 continues from operation 612 to operation 614, where rows are inserted into the table 400 and populated for each container that gives access rights to users in the same domain as the requester. The value of the rank field 402D in the newly added rows is set to 180. From operation 614, the routine 600 continues to operation 616.

At operation 616, a search is made for containers associated with the publisher that give permissions to users in a specified domain. If such containers are found, the routine 600 branches from operation 618 to operation 620. At operation 620, a determination is made as to whether the requestor is a member of the specified domain. If so, the routine 600 continues from operation 620 to operation 622, where rows are inserted into the table 400 and populated for each of the publisher's containers where the domain of the requestor is specified. The value of the rank field 402D in the newly added rows is set to 160. From operation 622, the routine 600 continues to operation 624.

At operation 624, the publisher's containers are searched to locate containers giving membership permissions to users in a federated domain. If such containers are found, the routine 600 branches from operation 626 to operation 628. At operation 628, a determination is made as to whether the requestor is a member of the specified federated domain. If so, the routine 600 continues from operation 628 to operation 630, where new rows are inserted into the table 400 and populated for each container where the requester is a member of the specified federated domain. The value of the rank field 402D in the newly added rows is set to 140. From operation 630, the routine 600 continues to operation 632.

At operation 632, the publisher's containers are searched to locate containers giving membership permissions to users in a public cloud domain. If such containers are found, the routine 600 branches from operation 634 to operation 636. At operation 636, a determination is made as to whether the requester is a member of the specified public cloud domain. If so, the routine 600 continues from operation 636 to operation 638, where new rows are inserted into the table 400 and populated for each container where the requestor is a member of the specified public cloud domain. The value of the rank field 402D in the newly added rows is set to 120. From operation 638, the routine 600 continues to operation 640.

At operation 640, a new row is added to the table 400 and populated for the default container. The value of the rank field 402D in the newly added row is set to 10. From operation 640, the routine 600 returns to operation 510, discussed above with respect to FIG. 5.

Figure 7:
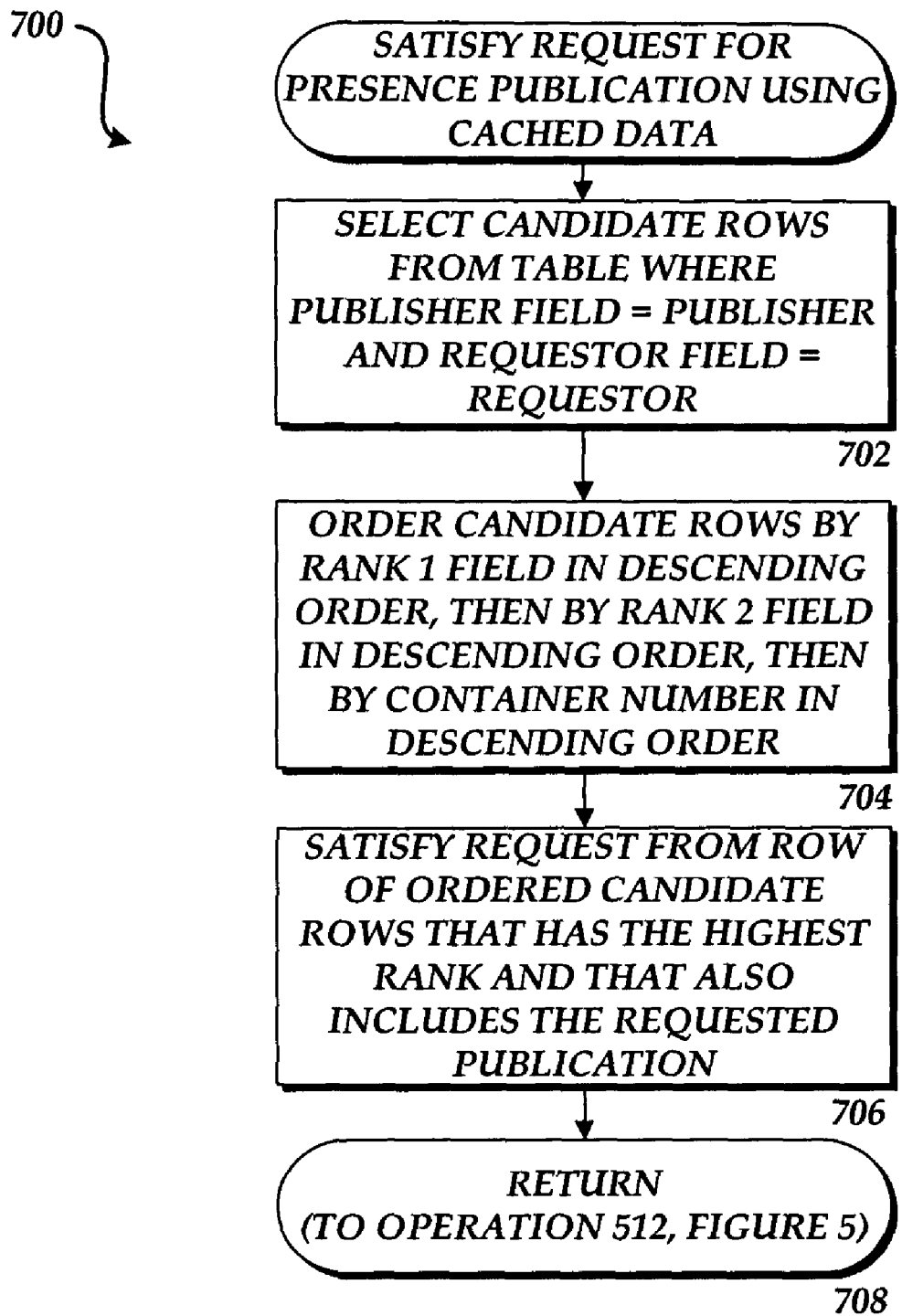
FIG. 7 is a flow diagram showing an illustrative routine for satisfying a request for cached presence data from the cached container member table discussed with reference to FIG. 4.

Referring now to FIG. 7, an illustrative routine 700 for satisfying a request for cached presence data from the cached container member table 400 will be described. The routine 700 begins at operation 702, where one or more candidate rows are selected from the table 400. A candidate row is a row that identifies the requester in the requestor data field 402C and that identifies the publisher in the publisher data field 402A. The candidate rows can be identified by performing a database "select" operation over the table 400. From operation 702, the routine 700 continues to operation 704.

At operation 704, the candidate rows are arranged in descending order based on the contents of the rank data field 402D. If the second rank data field 402E is utilized, the candidate rows are then arranged in descending rows based on the contents of the second rank data field 402E. The ordered candidate rows are then arranged in descending order based on the value contained in the container data field 402B. In this manner, the candidate rows are arranged in descending order first by rank and then by container number. It should be appreciated that this functionality may be performed by using a database "order" operation. From operation 704, the routine 700 continues to operation 706.

At operation 706, the particular container that should be utilized to satisfy the request is identified. In particular, a specific row of the candidate rows is identified by joining the set of candidate rows with the publication data fields 304 of the publisher's containers. This results in the selection of a candidate row that has the highest rank in the rank data field 402D and that refers to a container that includes the requested publication. The container identified by the container data field 402B of the selected row is utilized to satisfy the request. It should be appreciated that the functionality performed at operation 706 may be performed using a database "join" operation. From operation 706, the routine 700 continues to operation 708, where it returns to operation 512, discussed above with respect to FIG. 5.

Based on the foregoing, it should be appreciated that systems, methods, and computer-readable media for efficient database lookup operations are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for responding to a query of a database, the method being performed on a computing device coupled to the database, the method comprising:

receiving the query of the database from a requestor, the database storing user profiles, each user profile including a corresponding presence publication, the query of the database forming a request for a presence publication of the corresponding presence publications, wherein each corresponding presence publication is one of a plurality of instances of presence information, the plurality of instances of presence information indicating a willingness of a user to communicate and indicating an availability of the user, the user corresponding to the each user profile;

in response to receiving the query, converting one or more procedural checks into one or more database operations, and performing the database operations to generate a set of possible results for the query, wherein the one or more procedural checks comprise determining a container of a plurality of containers to satisfy the request for the presence publication wherein the container comprises one or more presence publications and associated permissions in the form of a membership data field, and wherein the one or more procedural checks further comprise determining that the membership data field indicates permission for the requestor to receive the one or more presence publications of the container;

storing the set of possible results for the query;

computing a specific answer to the query from the stored set of possible results wherein the specific answer comprises the one or more presence publications of the container;

responding to the database query with the specific answer; and satisfying further database queries by computing an answer to the query from the stored set of possible results.

2. The method of claim 1, wherein the query comprises a request for a presence publication, and wherein the set of possible results comprises a table containing one or more rows, each row having a publisher data field wherein is stored data identifying a publisher of the requested presence publication, a requestor data field wherein is stored data identifying the requestor of the presence publication, a container data field wherein is stored data identifying the container, and a rank data field wherein is stored a rank.

3. The method of claim 2, wherein computing a specific answer to the query comprises performing a select operation over the table to identify a set of candidate rows from the table and performing a join operation between the set of candidate rows and the publication data fields of the containers identified in the set of candidate rows to identify the specific answer.

4. The method of claim 3, wherein performing the database operations to generate a set of possible results for the query comprises:

creating a new row in the table for each container maintained by the publisher that identifies the requestor in the membership data field and, for each new row, storing data in the publisher data field identifying the publisher, storing data in the requestor data field identifying the requestor, storing data in the container data field identifying the container, and storing a value in the rank field.

5. The method of claim 4, wherein the table further comprises a second rank data field for storing data indicating the length of a match between a domain of the requestor and a domain identified in the membership data field of the container.

6. A computer storage media having computer-executable instructions stored thereon which, when executed by a computer, cause the computer to:

receive a database query from a requestor, the database storing user profiles, each user profile including a corresponding presence publication, the database query forming a request for a presence publication of the corresponding presence publications, wherein each corresponding presence publication is one of a plurality of instances of presence information, the plurality of instances of presence information indicating a willingness of a user to communicate and indicating an availability of the user, the user corresponding to the each user profile;

in response to the database query, compute an answer to the database query from a previously stored set of possible responses to the database query, wherein the previously stored set of possible responses to the database query is created by converting one or more procedural computations into one or more database operations and performing the database operations on a database to generate the set of possible results for the database query, wherein the one or more procedural computations comprise determining a container of a plurality of containers to satisfy the request for the presence publication wherein the container comprises one or more presence publications and associated permissions in the form of a membership data field, and wherein the one or more procedural checks further comprise determining that the membership data field indicates permission for the requestor to receive the one or more presence publications of the container; and to provide the answer in response to the database query wherein the answer comprises the one or more presence publications of the container.

7. The computer storage media of claim 6, wherein the set of possible responses comprises a table including one or more rows, each row including data identifying a requestor of the presence publication, a publisher of the presence publication, a container data structure of the container, and a first rank.

8. The computer storage media of claim 7, wherein the membership data field identifies the specific identity of the requestor or a domain with which the requestor is associated.

9. The computer storage media of claim 8, wherein the table further comprises data identifying a second rank, wherein the second rank indicates the length of a match between the domain with which the requestor is associated and a domain specified by the publisher.

10. The computer storage media of claim 9, wherein converting one or more procedural computations into one or more database operations and performing the database operations on a database to generate the set of possible results for the query comprises:

creating a new row in the table for each container maintained by the publisher that identifies the requestor in the membership data field and, storing data in each new row identifying the publisher, the requestor, the container, and a rank.

11. A method for responding to a request for a presence publication, the method being performed on a computing device, the method comprising:

receiving the request for the presence publication from a requestor, wherein the presence publication is a specific instance of presence information that includes data describing the availability of a user and an indication of the user's willingness to communicate;

in response to the request, determining whether a previously computed set of possible responses to the request exists;

in response to determining that the previously computed set of possible responses to the request exists, utilizing the previously computed set of possible responses to generate a response to the request for the presence publication; and in response to determining that the previously computed set of possible response to the request does not exist, computing the set of possible responses and utilizing the computed set of possible responses to generate a response to the request for the presence publication, wherein the computing comprises determining a container of a plurality of containers to satisfy the request for the presence publication wherein the container comprises one or more presence publications and associated permissions in the form of a membership data field, and wherein the computing further comprises determining that the membership data field indicates permission for the requestor to receive the one or more presence publications of the container, and wherein the response comprises the one or more presence publications of the container.

12. The method of claim 11, wherein the set of possible responses comprises a table including one or more rows, each row having a publisher data field wherein is stored data identifying a publisher of the requested presence publication, a requestor data field wherein is stored data identifying a requestor of the presence publication, a container data field wherein is stored data identifying a container, and a rank data field wherein is stored a rank.

13. The method of claim 12, wherein a container comprises a data structure including the membership data field for storing data identifying one or more requestors authorized to receive the presence publications contained in a publication data field of the container, and a publication data field for storing one or more presence publications that the members identified in the membership data field are authorized to receive.

14. The method of claim 13, wherein computing the set of possible responses comprises:

creating a new row in the table for each container maintained by the publisher that identifies the requestor in the membership data field and, for each new row, storing data in the publisher data field identifying the publisher, storing data in the requestor data field identifying the requestor, storing data in the container data field identifying the container, and storing a value in the rank field.

15. The method of claim 14, wherein utilizing the previously computed set of possible responses to generate a response to the request for the presence publication comprises:

selecting one or more candidate rows from the table, wherein a candidate row comprises a row in the table having data stored in the publisher data field corresponding to the publisher and data stored in the requestor data field corresponding to the requestor;

ordering the candidate rows in descending order based on the contents of the rank data field and subsequently ordering the candidate rows in descending order based on the contents of the container data field;

identifying the container from which the request should be satisfied by locating the row of the ordered candidate rows that has the highest rank and that also includes data in the container data field that refers to a container having the requested publication stored in its publication data field; and responding to the request utilizing the value of the requested publication stored in the publication data field of the identified container.

16. The method of claim 15, wherein the table further comprises a second rank data field for storing data indicating the length of a match between a domain of the requestor and a domain identified in the membership data field of a container.

17. A computer storage media having computer-executable instructions stored thereon which, when executed by a computer, cause the computer to perform the method of claim 11.

* * * * *